United States Patent
Mayhew

(10) Patent No.: US 7,859,217 B2
(45) Date of Patent: Dec. 28, 2010

(54) SYSTEM AND METHOD FOR OPERATING A SOFT STARTER IN CONJUNCTION WITH A SINGLE TO THREE PHASE STATIC CONVERTER

(75) Inventor: Scott Mayhew, North Aurora, IL (US)

(73) Assignee: Siemens Industry, Inc., Alpharetta, GA (US)

( * ) Notice: Subject to any disclaimer, the term of this patent is extended or adjusted under 35 U.S.C. 154(b) by 1295 days.

(21) Appl. No.: 11/207,279

(22) Filed: Aug. 19, 2005

(65) Prior Publication Data

US 2006/0049793 A1 Mar. 9, 2006

Related U.S. Application Data

(60) Provisional application No. 60/607,018, filed on Sep. 3, 2004.

(51) Int. Cl.
*H02P 27/04* (2006.01)
(52) U.S. Cl. .................. 318/800; 318/799; 318/798; 318/767; 318/727; 318/768
(58) Field of Classification Search .......... 318/800, 318/768, 799, 798, 767, 727; 363/131, 36, 363/49
See application file for complete search history.

(56) References Cited

U.S. PATENT DOCUMENTS

| | | | | |
|---|---|---|---|---|
| 4,386,394 A * | 5/1983 | Kocher et al. | ............... | 363/20 |
| 4,777,578 A * | 10/1988 | Jahns | ............... | 363/98 |
| 4,792,740 A * | 12/1988 | Smith | ............... | 318/768 |
| 4,926,104 A * | 5/1990 | King et al. | ............... | 318/599 |
| 5,272,616 A * | 12/1993 | Divan et al. | ............... | 363/49 |
| 5,402,053 A * | 3/1995 | Divan et al. | ............... | 318/768 |
| 5,856,916 A * | 1/1999 | Bonnet | ............... | 363/20 |
| 5,909,095 A * | 6/1999 | Sakti et al. | ............... | 318/400.35 |
| 5,969,957 A * | 10/1999 | Divan et al. | ............... | 363/36 |
| 6,060,859 A * | 5/2000 | Jonokuchi | ............... | 318/801 |
| 6,087,800 A * | 7/2000 | Becker et al. | ............... | 318/778 |
| 6,264,005 B1 * | 7/2001 | Kang et al. | ............... | 187/290 |
| 6,275,405 B1 * | 8/2001 | Pernyeszi | ............... | 363/154 |
| 6,496,397 B2 * | 12/2002 | Sakai et al. | ............... | 363/131 |
| 6,943,654 B2 * | 9/2005 | Zhou et al. | ............... | 335/106 |
| 6,956,728 B2 * | 10/2005 | Zhou et al. | ............... | 361/160 |
| 7,023,167 B2 * | 4/2006 | Smith | ............... | 318/727 |

\* cited by examiner

Primary Examiner—Walter Benson
Assistant Examiner—David S Luo
(74) Attorney, Agent, or Firm—Filip A. Kowalewski

(57) ABSTRACT

A motor controller system comprises solid state switches for connection between a single phase to three phase static converter and motor terminals for controlling application of three phase power to the motor. Sensors sense power from the static converter. A control is connected to the sensors and the solid state switches for controlling operation of the solid state switches to run the motor. The controller includes a three phase detection scheme for preventing operation of the solid state switches in the absence of desired three phase power from the static converter. A motor start scheme disables the three phase detection scheme for a select time after a motor run signal.

21 Claims, 4 Drawing Sheets

SYSTEM AND METHOD FOR OPERATING A SOFT STARTER IN CONJUNCTION WITH A SINGLE TO THREE PHASE STATIC CONVERTER

CROSS REFERENCE TO RELATED PATENT APPLICATIONS

This application claims priority of provisional application No. 60/607,018 filed Sep. 3, 2004.

FIELD OF THE INVENTION

This invention relates to a motor controller and more particularly, a system and method for operating a soft starter in conjunction with a single to three phase static converter.

BACKGROUND OF THE INVENTION

Solid state starters/controllers have found widespread use for controlling application of power to an AC induction motor. The conventional starter/controller, referred to hereinafter as simply a soft starter or a controller, uses solid state switches for controlling application of AC line voltage to the motor. The switches may be thyristors such as silicon controlled rectifiers (SCRs) or triacs.

One application for a motor controller is as an elevator starter. The elevator starter may be used to drive a pump for an hydraulic elevator. Each time movement of an elevator car is commanded, then the starter must start the motor until it reaches operating speed and then operate in a run mode. Such a starter may only be used for the up direction as gravity may be used for the down direction.

Most industrial and commercial establishments have three phase power readily available to power three phase motors and equipment. In situations where three phase power is not available, or cannot be made available, converters are often used to convert single phase power to three phase power. There are different types of single phase to three phase converters. One type is a rotary phase converter. A rotary phase converter includes a capacitor bank that in conjunction with a single phase supply starts a three phase motor to provide the third phase. Once the three phase motor achieves a threshold speed, the single phase supply, along with the generated third phase supply is the three phase voltage. The capacitor in this configuration is only used for starting. The use of a rotary phase converter requires operation of a motor to run another motor. This can be inefficient.

Another type of single phase to three phase converter, known as a static phase converter, uses capacitors to cause a phase shift in one of the single phase lines to create the third phase. When the converter is energized, the load must draw current to achieve the voltage shift in the capacitors required to enable a phase shift.

A typical soft starter requires an acceptable three phase supply before the SCRs are fired to provide power to the load. For systems that use a rotary converter, the soft starter must wait for the three phase motor portion of the converter to achieve a threshold speed required to provide an acceptable three phase supply for the soft starter to run the motor.

For systems using a static converter, at startup the soft starter receives single phase power which is not acceptable. Unless the soft starter receives an acceptable three phase supply, it will not gate the SCRs. Likewise, unless the soft starter gates the SCRs, there will not be an acceptable three phase supply. Additionally, some applications require a reverse phase, or voltage monitor to ensure that the voltage is in the proper rotation before allowing the motor to start. Under the circumstances described above, the protective relay will not allow the motor to start unless there is acceptable three phase power. Likewise, unless the motor is allowed to start, the static converter cannot produce three phase voltages.

As of the result of problems associated with conventional systems and methods for operating a soft starter with a single phase to three phase static converter, mechanical starters which include contactors are generally used instead of a soft starter. However, while a mechanical starter can allow a motor to start and run, mechanical starters do not provide the current control, fault detection, and motor protection that a solid state device such as a soft starter provides.

The present invention is directed to solving one or more of the problems discussed above, in a novel and simple manner.

SUMMARY OF THE INVENTION

In accordance with the invention, there is provided a system and method for operating a soft starter in conjunction with a single to three phase static converter.

Broadly, there is disclosed in accordance with one aspect of the invention a motor controller system comprising solid state switches for connection between a single phase to three phase static converter and motor terminals for controlling application of three phase power to the motor. Sensors sense power from the static converter. A control is connected to the sensors and the solid state switches for controlling operation of the solid state switches to run the motor. The controller includes a three phase detection scheme for preventing operation of the solid state switches in the absence of desired three phase power from the static converter. A motor start scheme disables the three phase detection scheme for a select time after a motor run signal.

It is a feature of the invention that the three phase detection scheme compares zero crossings of power from the static converter to verify that the zero crossings are separated a select number of electrical degrees apart. The three phase detection scheme may also verify that a three phase power is in a proper rotation.

It is a feature of the invention that the three phase detection scheme verifies that the zero crossings are more than 15 electrical degrees apart.

It is another feature of the invention that the control comprises a programmed processor.

It is still a further feature of the invention that the select time is in a range of about 0.20 to 0.50 seconds.

There is disclosed in accordance with another aspect of the invention an elevator starter comprising solid state switches for connection between a single phase to three phase static converter and motor terminals for controlling application of three phase power to the elevator. Sensors sense power from the static converter. A control is connected to the sensors and the solid state switches for controlling operation of the solid state switches to run the elevator. The control includes a three phase detection scheme for preventing operation of the solid state switches in the absence of desired three phase power from the static converter, and a motor start scheme for disabling the three phase detection scheme for a select time after an elevator run signal.

There is disclosed in accordance with a further aspect of the invention a motor controller system comprising solid state switch means for connection between a single phase to three phase static converter and motor terminals for controlling application of three phase power to the motor. Sensing means sense power from the static converter. Control means connected to the sensing means and the solid switch means control operation of the solid state switch means to run the motor. The control means comprise three phase detection means for preventing operation of the solid state switch means in the absence of desired three phase power from the static converter, and a motor start means for disabling the three phase detection means for a select time after a motor run signal.

There is disclosed in accordance with yet another aspect of the invention the method of operating a soft starter in conjunction with a single phase to three phase static converter comprising: providing solid state switches for connection between a single phase to three phase static converter and motor terminals for controlling application of three phase power to the motor; sensing power from the static converter; and controlling operation of the solid state switches to run the motor; operating a three phase detection scheme for preventing operation of the solid state switches in the absence of desired three phase power from the static converter; and disabling the three phase detection scheme for a select time after a motor run signal.

There is disclosed in accordance with yet another aspect of the invention the method of operating a soft starter in conjunction with a single phase to three phase static converter comprising: providing solid state switches for connection between a single phase to three phase static converter and motor terminals for controlling three phase power to the motor; sensing power from the static converter; initiating a timer in response to a motor run signal; controlling operation of the solid state switches to start the motor; determining if desired three phase power is supplied from the static converter; and allowing the motor to run for a select time period after initiating the timer and after the select time period faulting out if desired three phase power is not supplied from the static converter.

Further features and advantages of the invention will be readily apparent from the specification and from the drawings.

DETAILED DESCRIPTION OF THE INVENTION

Figure 1:
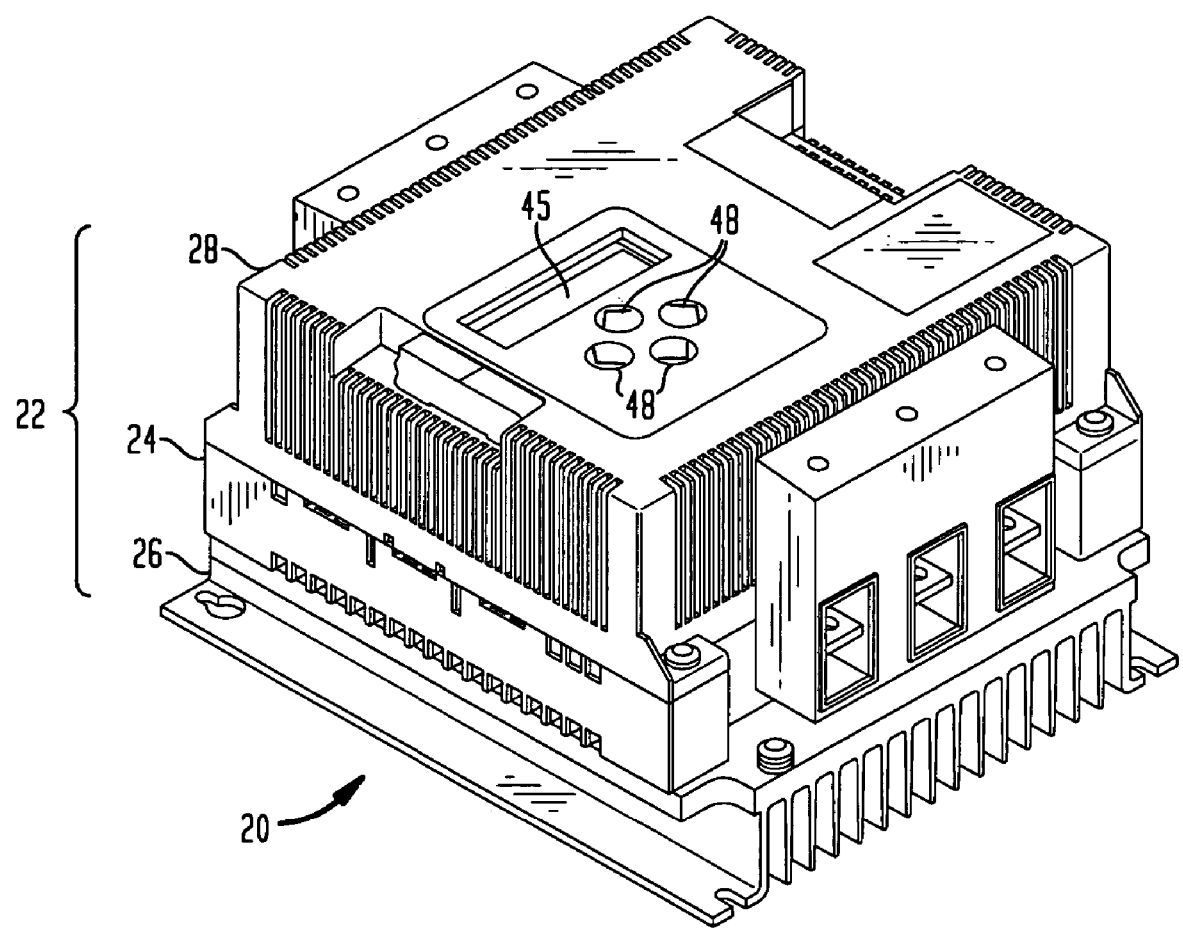
FIG. 1 is a perspective view of a motor controller in accordance with the invention.

Referring initially to FIG. 1, a solid state motor soft starter/controller 20, referred to hereinafter as simply a soft starter or a controller, is illustrated. One application for the motor controller 20 is as an elevator starter. The motor controller 20 may be used to drive a pump for an hydraulic elevator. Each time movement of an elevator car is commanded, then the motor controller 20 must start the elevator motor until it reaches operating speed and then operate in a run mode. Such a motor controller 20 may only be used for the up direction as gravity may be used for the down direction.

The motor controller 20 comprises a housing 22 including a housing base 24, a heat sink 26 and a cover 28. The motor controller 20 includes a plurality of solid state switches 32 in the form of thyristors, such as back to back connected silicon controlled rectifier (SCR) pairs, see FIG. 2. For simplicity herein, the SCR pairs 32 are referred to as simply SCRs. Triacs could also be used. The SCRs 32 control application of three phase AC line voltage to a three phase motor. As is apparent, a different number of SCRs 32 could be used to control different numbers of phases, as is apparent to those skilled in the art. Each SCR 32 is connected between a line terminal L1, L2 or L3 and a respective motor winding terminal T1, T2 or T3.

Figure 2:
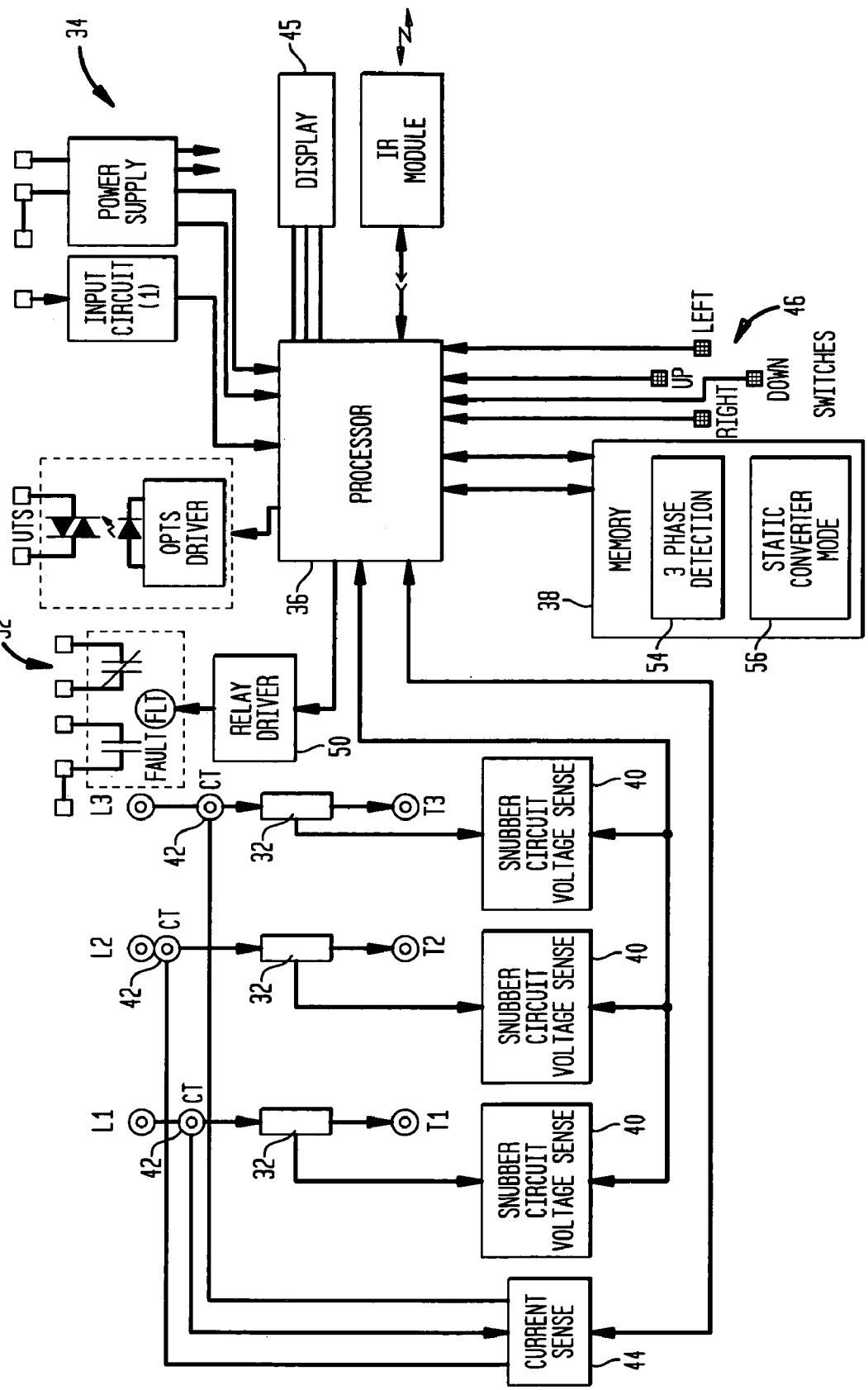
FIG. 2 is a block diagram of the motor controller of FIG. 1.

The SCRs 32 are mounted to the heat sink 26 within the housing 20. Referring also to FIG. 2, a control circuit, or simply control, 34 is also enclosed in the housing 20. The control circuit 34 controls operation of the SCRs 32. Particularly, the control circuit 34 includes a programmed processor 36, such as a digital signal processor, for commanding operation of the SCRs 32. A memory 38 is connected to the processor 36 and stores programs and configuration information relating to operation of the SCRs 32, as described below.

The processor 36 is connected to three interface circuits 40 each operatively associated with one of the SCRs 32. Particularly, the interface circuits 40 comprise snubber circuits for driving the SCRs 32 and voltage sense circuits for sensing line voltages L1, L2 and L3 and motor terminal voltages T1, T2 and T3. A current transformer 42 senses current through each of the SCRs 32 and is connected to a current sense circuit 44. Other types of current sensors could be used. The current sense circuit 44 is also connected to the processor 36. The interface circuits and/or the current sense circuit 44 are used to monitor power delivered to the line terminals L1, L2 and L3.

An LCD display 45 on the cover 22, see FIG. 1, is connected to the processor 36. The display 45 is used to indicate configuration settings, operating values, fault conditions, and the like. User actuable switches 46 are electrically connected to the processor 36. The user actuable switches 46 are actuated by actuator elements 48 on the housing cover 22, see FIG. 1. Particularly, the switches 46 are used for locally selecting parameters for stored configuration information.

The processor 36 is connected to a relay driver circuit 50 that operates a fault contactor 52. The fault contactor 52 actuates fault contacts FC1, FC2 and FC3, see FIG. 3, to disable motor operation under fault conditions.

Figure 3:
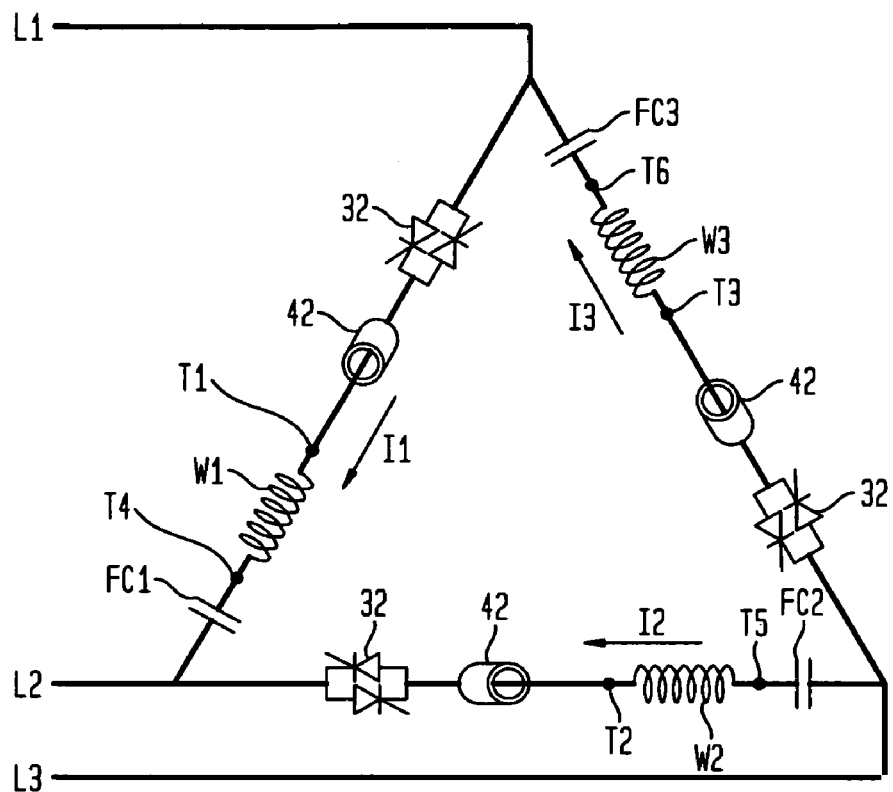
FIG. 3 is a wiring diagram of the motor controller of FIG. 1 connected to an elevator motor in a delta configuration.

Referring to FIG. 3, an electrical schematic illustrates connection of the SCRs 32 of FIG. 2 to motor windings in a delta configuration. For example, one of the SCRs 32 is connected between the first phase line voltage L1 and the first motor terminal T1. The first motor winding W1 is connected in series with the SCR 32 between the motor terminal T1 and another motor terminal T4. The current transformers 42 sense current through the winding W1. A fault contact FC1 is also connected in series. The other legs of the delta configuration are generally similar and are conventional in nature. As is apparent, other motor configurations could be used in connection with the disclosed system and method.

The processor 36 of FIG. 2 operates in accordance with a control program for controlling operation of the SCRs 32. Particularly, each SCR 32 is conventionally controlled to satisfy voltage and current requirements. This is done by altering the firing angle of the SCRs 32. As is conventional, the firing angle is controlled by the processor 36 to satisfy operating requirements. During start mode, the processor 36 ramps the current up by gradually advancing the firing angle in a time specified to satisfy preselect acceleration time and acceleration torque values up to a select starting current limit setting value. By adjusting the delay in firing the SCRs 32, the processor 36 can maintain this level. As the motor speed increases, the current begins to decrease. The processor 36 continually increases the voltage to offset the reduction in current. This maintains a constant current at the setting of the starting current limit switch provided that the voltage to the motor can be increased at a rate greater than the decrease in the motor slip resistance as the motor comes up to speed. Subsequently during a run mode the control circuit 34 applies full voltage to the motor.

In accordance with the invention, the control circuit 34 uses a three phase detection scheme or module 54 for preventing operation of the SCRs 32 in the absence of desired three phase power, and a static converter mode module 56 used in a motor start scheme for disabling loss of phase detection of the three phase detection module 54 for a select time after a motor run signal.

The three phase detection module 54 prevents motor operation if three phase power is not present at the line terminals L1, L2 and L3. The three phase detection module 54 senses zero crossings of line current as sensed by the current sense circuit. With three phase power the zero crossings of the phases should normally be about 60 degrees apart. The three phase detection module 54 makes a positive determination that incoming power is not single phase power and, more particularly, verifies that the zero crossings are separated at least 15 electrical degrees from one another. Also, the three phase detection module 54 verifies that power rotation matches an ABC or CBA setting. If either of these conditions do not exist, then motor operation is prevented.

Figure 4:
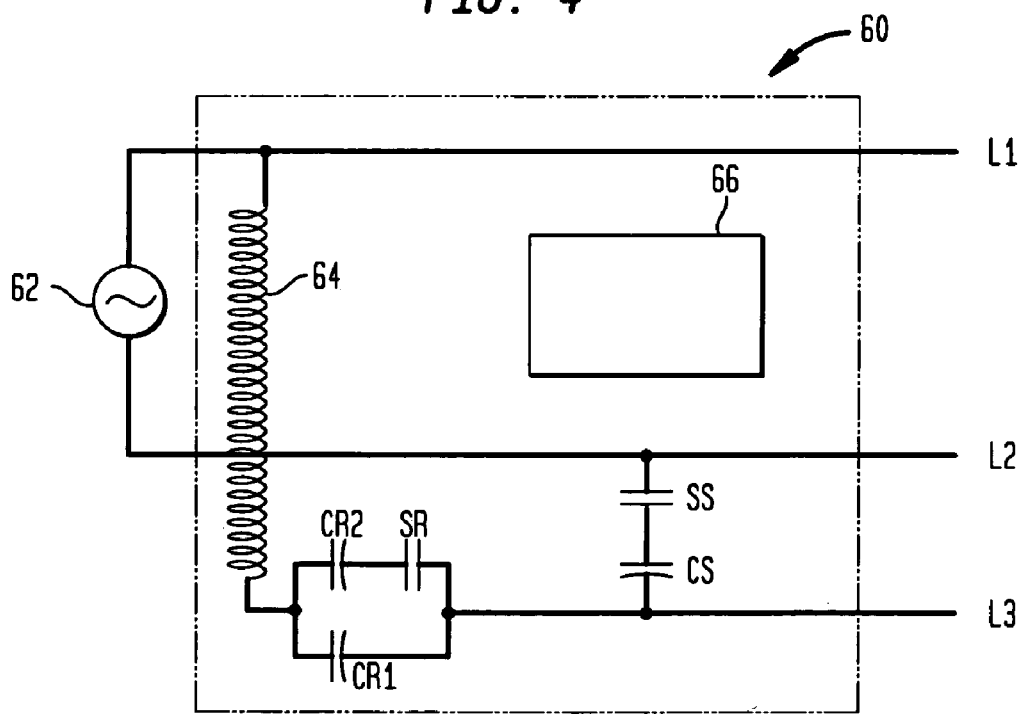
FIG. 4 is an electrical schematic of a single phase to three phase static converter.

Referring to FIG. 4, an exemplary single phase to three phase static converter 60 is illustrated. The static converter 60 includes a single phase power source 62 developing power at lines L1 and L2. A transformer 64 is connected to the line L1. A first run capacitor CR1 is connected between the transformer 64 and a third phase line L3. A second run capacitor CR2 and run switch SR are connected in series across the first run capacitor CR1. A start switch contact SS is connected in series with a start capacitor CS between the second phase line L2 and the third phase line L3. A controller 66 controls operation of the switch contacts SR and SS to generate three phase power.

The start switch contact SS is energized when starting a load connected to the static converter 60. The run switch contact SR is energized as needed by the control 66 to maintain a desired phase shift. Particularly, the control circuit 66 varies run capacitance to generate three phase power on the terminals L1, L2 and L3 from the single phase power source 62.

In accordance with the invention, the three phase power from the static converter 60 on the lines L1-L3 of FIG. 2 supply power to the delta motor in the configuration of FIG. 3. However, a conventional motor controller will not start in a single phase condition as it expects 120 degree out of phase relationships between the different phases. A conventional motor controller will not start if the phases are 180 degrees apart, such as with single phase power. In accordance with the invention, the static converter mode module 56, see FIG. 2, allows the control circuit 34 to fire the SCRs 32 for a select time period, even if single phase power is supplied, and thereafter use loss of phase detection of the three phase detection module 54 to ensure that input power is not single phase. Allowing the motor to start enables the static converter 60 to develop the desired phase shift.

Figure 5:
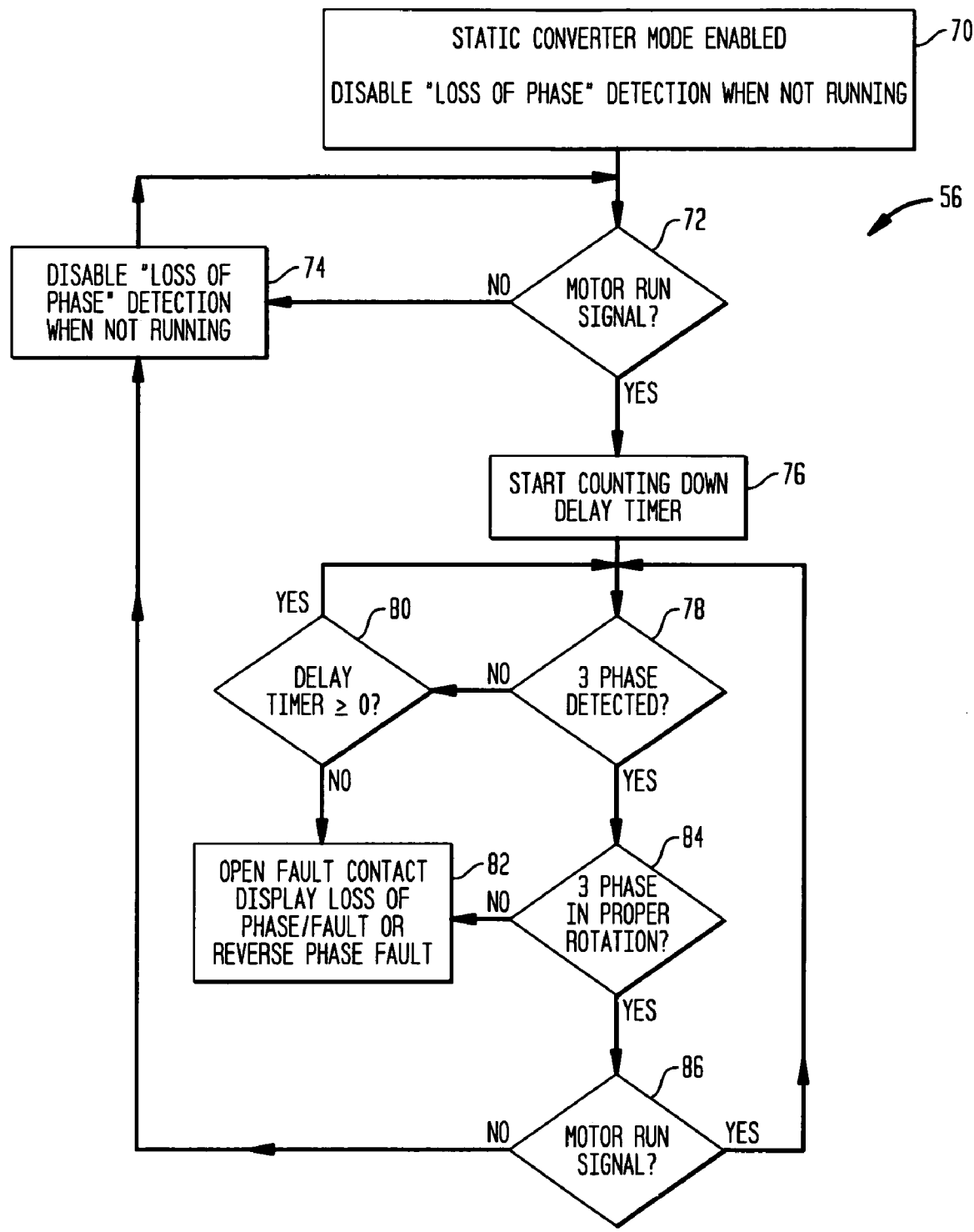
FIG. 5 is a flow diagram illustrating a static converter mode module implemented by the processor of FIG. 2.

A flow diagram illustrating sequence of operation of the static converter mode module 56 is illustrated in FIG. 5. This module is used when the static converter mode is enabled at a block 70. When the motor is not running, the loss of phase detection of the three phase detection module is disabled. A decision block 72 determines if there is a motor run signal present. If not, then a block 74 disable the loss of phase detection and loops back to the decision block 72.

Once a motor run signal is detected at the decision block 72, such as when a start command is received, a delay timer is initiated at a block 76. In an illustrated embodiment of the invention, the delay timer comprises a countdown timer. The timer counts down a select time period during which the loss of phase detection of the three phase detection module 54 is disabled. In accordance with the invention, the select time period is adjusted for a normal load in a particular application so that the static converter 60, see FIG. 4, will provide desired three phase power. The select time period may be in a range of about 0.20 to 0.50 seconds.

After the delay timer is started, a decision block 78 determines if three phase power is detected by the three phase detection scheme 54. If not, then a decision block 80 determines if the delay counter time is greater than zero. If so, then the module loops back to the decision block 78 to wait for the countdown time to elapse. In this manner the loss of phase detection is disabled for the select time period. If the countdown time has elapsed, and the three phase detection module 54 still does not detect three phases at the decision block 78, then the static converter 60 has not developed the desired phase shift and the fault contactor 52 is opened at a block 82 and the control displays a loss of phase fault or reverse phase fault. If three phases are detected at the decision block 78, then a decision block 84 determines if the three phases are in proper rotation. If not, then the control proceeds to the block 82 to fault out. If proper rotation is determined at the decision block 84, then a decision block 86 determines if there is still a motor run signal. If not, then control proceeds to the block 74 to disable the loss of phase detection. If there is still a motor run signal, then the control loops back to the decision block 78.

Thus, the control circuit 34 is operable, when a motor run signal is received, to start a countdown timer and check to see if incoming phases are more than 15 degrees apart and if there is proper rotation. If the phases are not more than 15 degrees apart, and the timer is not yet zero, then the module 56 continues to check the phases. If the phases are more than 15 degrees apart, then the phase rotation is checked. If rotation is improper, then the control circuit faults out. As discussed above, the time delay is selected to allow the current through the static converter capacitors to set up a phase shift. Once the phase shift is detected after the time delay, the starter 20 will continue to monitor for proper rotation and valid three phase shift.

Although this invention is described for an exemplary elevator soft starter, one of ordinary skill in the art will appreciate that the invention can be applied to other applications that include AC induction motor controls and static phase converters.

While the system and method are described herein in connection with a delta configuration, as shown in FIG. 3, the system and method could be used with other wiring configurations, as will be apparent to those skilled in the art.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

It can therefore be appreciated that a new and novel system and method for operating a soft starter in conjunction with a single to three phase static converter has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

I claim:

1. A motor controller system comprising:
   solid state switches for connection between a single phase to three phase static converter and motor terminals for controlling application of three phase power to the motor;
   sensors for sensing power from the static converter; and
   a control connected to the sensors and the solid state switches for controlling operation of the solid state switches to run the motor, the control including a three phase detection scheme for preventing operation of the solid state switches in the absence of desired three phase power from the static converter, and a motor start scheme for disabling the three phase detection scheme for a select time after a motor run signal.

2. The motor controller system of claim 1 wherein the three phase detection scheme compares zero crossings of power from the static converter to verify that the zero crossings are separated a select number of electrical degrees apart.

3. The motor controller system of claim 1 wherein the three phase detection scheme monitors zero crossings of power from the static converter and verifies that the zero crossings are separated a select number of electrical degrees apart and are in a proper rotation.

4. The motor controller system of claim 3 wherein three phase detection scheme verifies that the zero crossings are more than 15 electrical degrees apart.

5. The motor controller system of claim 1 wherein the control comprises a programmed processor.

6. The motor controller system of claim 1 wherein the select time is in a range of about 0.20 to 0.50 seconds.

7. An elevator starter comprising:
   solid state switches for connection between a single phase to three phase static converter and motor terminals for controlling application of three phase power to the elevator;
   sensors for sensing power from the static converter; and
   a control connected to the sensors and the solid state switches for controlling operation of the solid state switches to run the elevator, the control including a three phase detection scheme for preventing operation of the solid state switches in the absence of desired three phase power from the static converter, and a motor start scheme for disabling the three phase detection scheme for a select time after an elevator run signal.

8. The elevator starter of claim 7 wherein the three phase detection scheme monitors zero crossings of power from the static converter and verifies that the zero crossings are separated a select number of electrical degrees apart and are in a proper rotation.

9. The elevator starter of claim 8 wherein the three phase detection scheme verifies that the zero crossings are more than 15 electrical degrees apart.

10. The elevator starter of claim 7 wherein the select time is in a range of about 0.20 to 0.50 seconds.

11. The elevator starter of claim 7 wherein the control circuit comprises a programmed processor.

12. A motor controller system comprising:
    solid state switch means for connection between a single phase to three phase static converter and motor terminals for controlling application of three phase power to the motor;
    sensing means for sensing power from the static converter; and
    control means connected to the sensing means and the solid state switch means for controlling operation of the solid state switch means to run the motor, the control means comprising three phase detection means for preventing operation of the solid state switch means in the absence of desired three phase power from the static converter, and a motor start means for disabling the three phase detection means for a select time after a motor run signal.

13. The motor controller system of claim 12 wherein the three phase detection means monitors zero crossings of power from the static converter and verifies that the zero crossings are separated a select number of electrical degrees apart and are in a proper rotation.

14. The motor controller system of claim 13 wherein the three phase detection means verifies that the zero crossings are more than 15 electrical degrees apart.

15. The motor controller system of claim 12 wherein the select time is in a range of about 0.20 to 0.50 seconds.

16. The motor controller system of claim 12 wherein the motor control means comprises a programmed processor.

17. A method of operating a soft starter in conjunction with a single phase to three phase static converter comprising:
    providing solid state switches for connection between a single phase to three phase static converter and motor terminals for controlling application of three phase power to the motor;
    sensing power from the static converter; and
    controlling operation of the solid state switches to run the motor;
    operating a three phase detection scheme for preventing operation of the solid state switches in the absence of desired three phase power from the static converter; and
    disabling the three phase detection scheme for a select time after a motor run signal.

18. The method of claim 17 wherein the three phase detection scheme is disable for a preselect time in a range of about 0.20 to 0.50 seconds.

19. A method of operating a soft starter in conjunction with a single phase to three phase static converter comprising:
    providing solid state switches for connection between a single phase to three phase static converter and motor terminals for controlling three phase power to the motor;
    sensing power from the static converter;
    initiating a timer in response to a motor run signal;
    controlling operation of the solid state switches to start the motor;
    determining if desired three phase power is supplied from the static converter; and
    allowing the motor to run for a select time period after initiating the timer and after the select time period faulting out if desired three phase power is not supplied from the static converter.

20. The method of claim 19 wherein the select time period is in a range of about 0.20 to 0.50 seconds.

21. The method of claim 19 further comprising faulting out if three phase power is not in a proper rotation.

* * * * *